No. 12,247. REISSUED JULY 26, 1904.

J. F. LYDON.

DOOR HANGER.

APPLICATION FILED MAY 22, 1903.

Witnesses:

H. S. Gaither

E. K. Lundy.

Inventor:

John F. Lydon.

by Frank D. Thomason his Attorney.

No. 12,247. Reissued July 26, 1904.

UNITED STATES PATENT OFFICE.

JOHN F. LYDON, OF DAVENPORT, IOWA, ASSIGNOR TO THE INTERNATIONAL MANUFACTURING COMPANY, OF DAVENPORT, IOWA, A CORPORATION OF IOWA.

DOOR-HANGER.

SPECIFICATION forming part of Reissued Letters Patent No. 12,247, dated July 26, 1904.

Original No. 705,262, dated July 22, 1902. Application for reissue filed May 22, 1903. Serial No. 158,299.

*To all whom it may concern:*

Be it known that I, JOHN F. LYDON, a citizen of the United States, and a resident of Davenport, in the county of Scott and State of Iowa, have invented certain new and useful Improvements in Door-Hangers, of which the following is a full, clear, and exact description.

My invention relates to door-hangers; and its object is to provide such a connection between the sliding door and the means for supporting the same that the door can be easily moved laterally to a limited extent in planes parallel to its plane of rest, so that when opened or closed its movements will not be interfered with or obstructed by rubbing against the surrounding framework of the door and so that when in proper position it can be locked flush against and in the jamb of a doorway to securely close the same and prevent drafts which, particularly in barn-doors now in extensive use, are so prevalent. This I accomplish by the means hereinafter fully described and as particularly pointed out in the claims.

Figure 1:
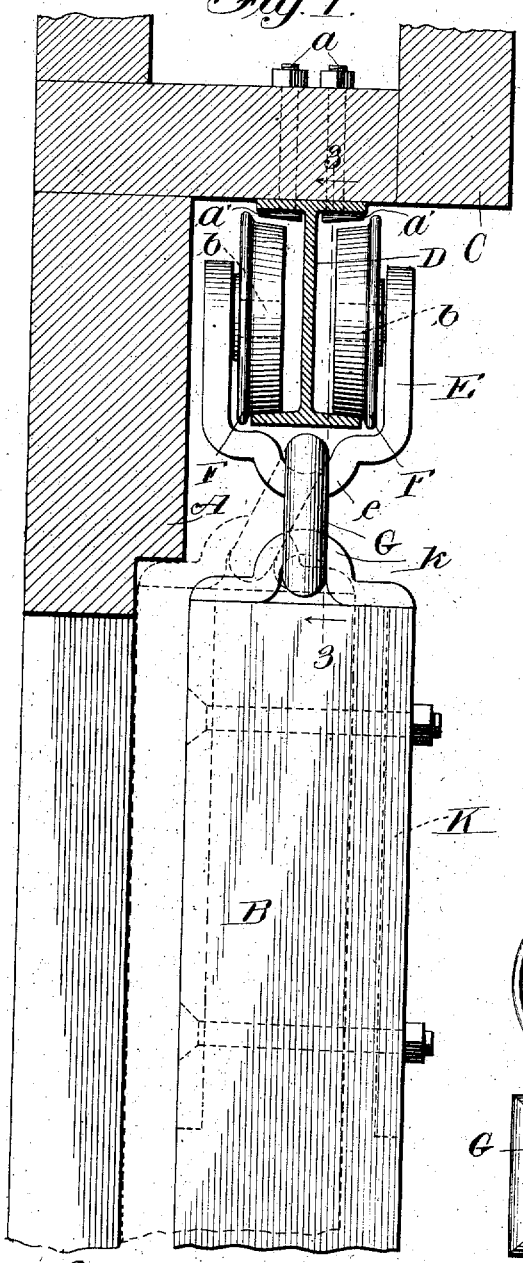
Figure 2:
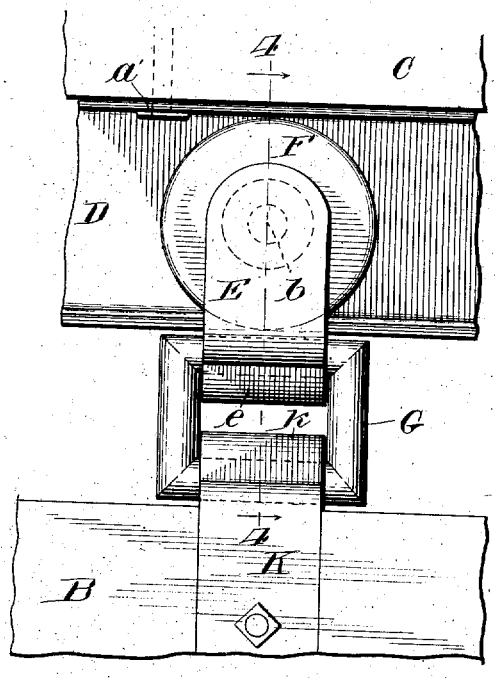
Figure 3:
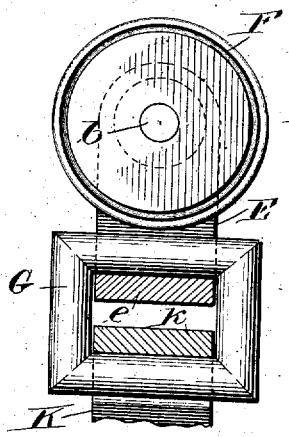
Figure 4:
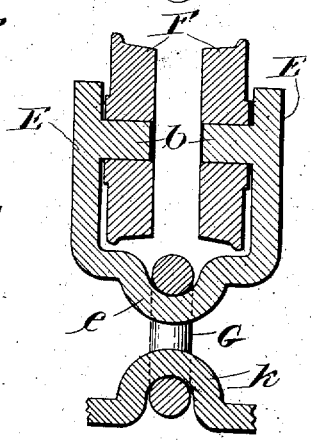

In the drawings, Figure 1 is an end edge view of a door suspended on the outside of the wall having my improved door-hanger applied thereto. Fig. 2 is a side view of a broken-away upper portion of said door, showing my invention in side elevation. Fig. 3 is a vertical longitudinal section through said hanger, showing the straps which attach to the door broken away. Fig. 4 is a transverse vertical section through the same.

The requirements of my invention are such that the doorway A, which is closed by a sliding door B, has a short distance above its upper edge a horizontal overhanging structure constructed as shown in the drawings or in any other suitable manner. Secured to the under side of this superimposed structure C by means of the bolts *a a* is a longitudinally-disposed I-beam D of suitable dimensions arranged horizontally, so as to serve as a track or tram. This I-beam D preferably has the under side of its upper flanges made, preferably, flat and at right angles to the plane of the sides of the vertical web of said beam, and the heads *a′ a′* on the lower ends of these bolts are flattened to a considerable extent and inclined or beveled, as shown, so as not to be in the way of the wheels of the hanger traveling on said beam.

The hanger consists of a U-shaped yoke E, the corresponding legs of which pass up on each side of the lower flanges of the I-beam and have alining studs *b b* projecting horizontally inward from near their upper ends. The distance between the vertical branches or legs of this yoke E is slightly greater than that between the edges of the oppositely-projecting lower flanges of the beam, and the studs *b* each project about one-third the distance between said branches, thus leaving a clearance between their ends corresponding to the remaining third of said space. Rollers F are journaled on said studs *b* and preferably correspond in thickness to just about the length of the stud upon which each is respectively journaled. These rollers F have circumferential flanges on their outer sides, are loosely journaled on said studs, and their treads are beveled to correspond to the bevel of the lower flanges of the I-beam upon which they travel. The diameter of the tread of the rollers is but slightly less than the distance between the upper and lower flanges of the beam; but the diameters of the flanges thereof are greater than such distance. When, therefore, the hanger is in position on the I-beam track or tram, these circumferential flanges by coming in contact with the edges of the flanges of the I-beam track effectually prevent said roller from working off studs *b*.

At a point under the lower flange of the I-beam, in alinement with the vertical web thereof, the bend of the yoke is provided with an opened bearing or knuckle *e*, and journaled in this opened bearing or knuckle is the upper horizontal part of a link G. The lower horizontal stretch of this link passes under and articulates with the saddle *k* of the inverted-U-shape strap K, the legs of which pass on either side of and are secured to the upper portion of the door. This saddle is formed by forcing upward the metal in the center of length of the crotch or bend of strap K, which fits over the top of the door, and thus makes an inverted channel and forms a knuckle in which the lower horizontal part of the link has bearings, which is the reversed counterpart of knuckle *e*.

The beam D is located such a distance from the adjoining wall that the door suspended by the hanger just described is removed therefrom a sufficient distance to allow of the free passage of the same. Thus it will be seen that the door can be slid in either direction without experiencing the usual rubbing contact with the wall and the door-frame. It has been found in practice that if the opposing surfaces of the door and adjacent portions of the supporting-wall are both practically unbroken, as is usually the case, the sliding of the door causes currents of air to pass between it and the wall and to cushion it in a measure, so that it is held apart from the wall and parallel thereto. This unrestricted lateral movement of the door, both toward and away from the adjacent wall, in a plane parallel to the normal plane of suspension is not possible, in so far as I am aware, with the roller-hangers heretofore in use. There are roller-hangers permitting the door to be moved in planes parallel to its plane of rest toward the wall of its support, but none that permit the door to be moved outward from its plane of rest except as it is swung outward from the tram or track at an angle to the plane of the adjacent wall, in which position their upper edges are in closer proximity to the wall than their lower edges. When it is desired to close the door, it is moved laterally, as shown in dotted lines in Fig. 1, until it is in contact with said wall and seated in the jamb provided for the same, whereupon it is locked in such position by any suitable means. The fact that the door retains its vertical position when being closed sidewise against the doorway enables it to close tight against the jamb at all points and in a manner impossible to accomplish if hung in the usual way. The moment the door is unlocked its own weight causes it to gravitate into the position shown in Fig. 1 away from the wall, whereupon it can be freely moved as desired in either direction.

If desired, the door might be hung dead against the wall, and when it is considered necessary to move the same it could be pulled outward away from said wall to pass the jamb and then moved in the proper direction. This is very easily accomplished, as a slight sliding movement of the door causes the air-cushioning effect heretofore described, and as long as the door is in motion it stands out from the wall, settling back to its normal position when it stops.

What I claim as new is—

1. The combination with a suitable overhead tram or track, and a door carrier or truck adapted to move thereon, of means suspending the door from said carrier adapted to allow lateral movement of the door in opposite directions, in planes parallel to its plane of rest, substantially as described.

2. The combination with a suitable overhead tram or track, and a carrier or truck adapted to move thereon, of a suspended door, and a laterally-movable rectangular link connecting said carrier and door, and articulated both at its point of connection with said door and said carrier, substantially as described.

3. The combination with a suitable tram or track, a door carrier or truck adapted to move thereon, and a door, of a link articulated in planes parallel to and mediate the sides of said door and said carrier, substantially as described.

4. The combination with a suitable overhead tram or track, of a carrier comprising a U-shaped yoke the bend of which is below and the legs of which pass on each side of the lower flanges of said tram or track, and wheels journaled thereon, of a suspended door, knuckles secured to the upper edge thereof, and a rectangular chain-link having the horizontal portions thereof seated in and articulating with the bend of said yoke and the said knuckles, substantially as described.

In testimony whereof I have hereunto set my hand this 31st day of January, 1903.

JOHN F. LYDON.

Witnesses:

JOHN C. LYDON,
MARGARET C. LYDON.